Figure 1:
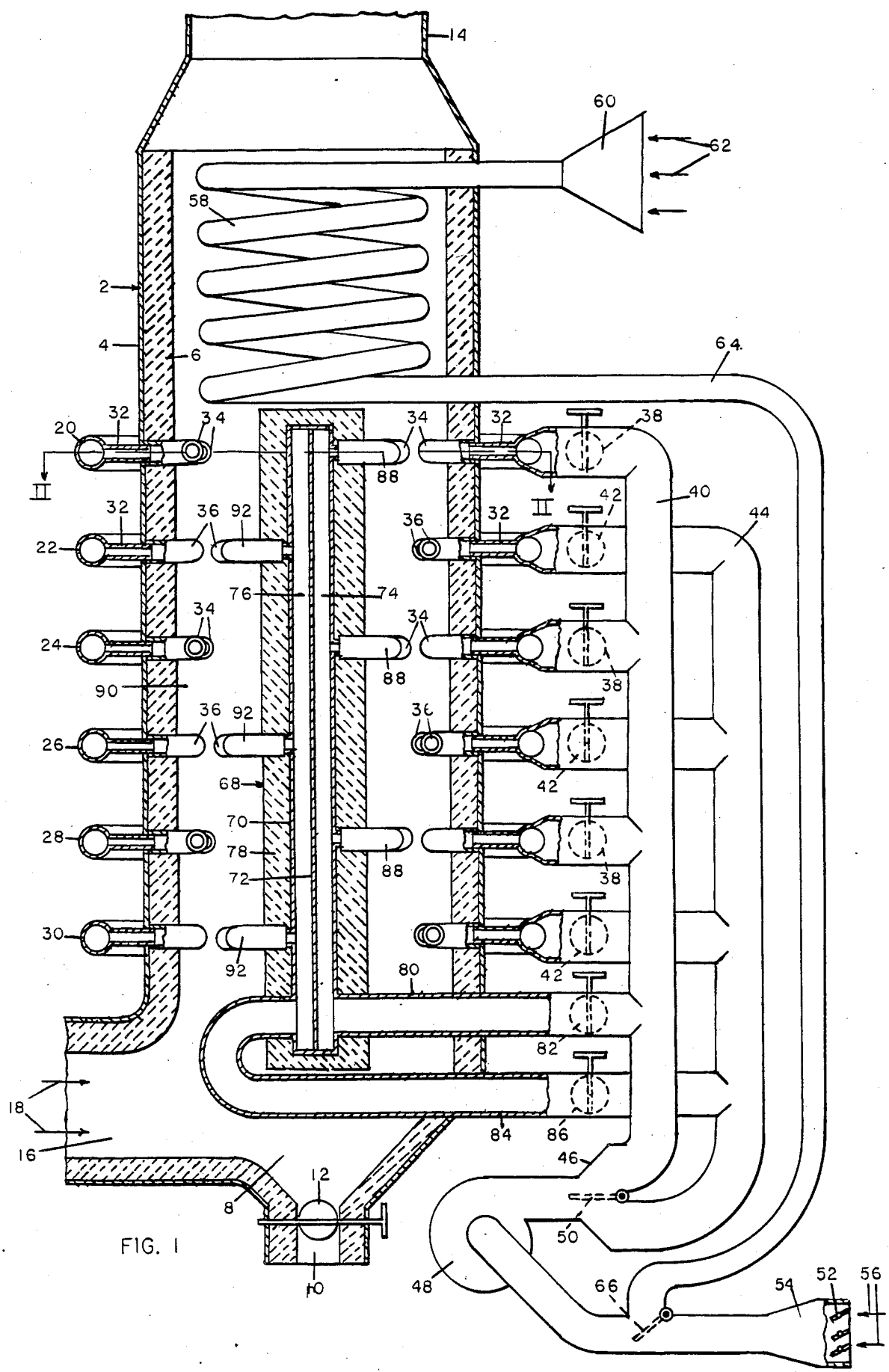

United States Patent [19]

Angelo, II

[11] Patent Number: 4,635,568
[45] Date of Patent: Jan. 13, 1987

[54] FURNACE AFTERBURNER

[76] Inventor: James F. Angelo, II, P.O. Box 55275, Little Rock, Ark. 72225

[21] Appl. No.: 845,344

[22] Filed: Mar. 28, 1986

[51] Int. Cl.$^4$ ............................ F23B 5/00; F23C 9/00; F23G 7/06
[52] U.S. Cl. .................................. 110/214; 422/168; 431/5
[58] Field of Search .................... 110/214; 431/5, 202, 431/9, 10; 422/168

[56] References Cited

U.S. PATENT DOCUMENTS

| | | | |
|---|---|---|---|
| 3,567,399 | 3/1971 | Altmann et al. | 431/5 X |
| 3,754,869 | 8/1973 | Van Raden | 431/5 X |
| 3,794,459 | 2/1974 | Meenan | 431/5 |
| 4,466,359 | 8/1984 | Weber et al. | 110/214 X |

*Primary Examiner*—Edward G. Favors
*Attorney, Agent, or Firm*—John A. Hamilton

[57] ABSTRACT

A furnace afterburner consisting of an elongated combustion chamber through which the exhaust effluvia of a furnace is drawn, and in which a series of sets of air jet nozzles are arranged in longitudinally spaced relation along the chamber, which inject air tangentially into the chamber to generate vortices of air and exhaust spinning in alternately opposite angular directions. The injected air may be preheated. The central core area of the chamber is filled and obstructed to prevent inefficient combustion which would otherwise occur in the "eyes" of the vortices. Damper controls are provided to induce and reinforce other variations of conditions within the chamber, such as those capable of producing better retention time, better turbulence, air-gas mix proportions and temperature, all with the purpose of providing better combustion with a high degree of controllability in a wide variety of operating conditions.

9 Claims, 2 Drawing Figures

FURNACE AFTERBURNER

This invention relates to new and useful improvements in furnace afterburners.

Nearly all furnaces emit exhaust containing more or less large amounts of combustible but still unburned material, such as gases, particulate material, or both, and afterburners are often employed for burning the combustible components as completely as possible to avoid pollution of the atmosphere. The term "furnace", as used herein, includes nearly all kilns, retorts and the like intended for the combustion or partial combustion of raw materials, including toxic and hazardous wastes, carbonaceous materials, whether stationary or rotary. Perhaps the worst offenders; so far as polluting exhaust is concerned, are those in which the raw material is gasified, pyrolyzed, voltatilized, or destructively distilled, since these reactions usually must be carried on in the presence of insufficent oxygen to support full combustion and reduction to ash of the raw material, with the result that the exhaust contains dense, black, highly noxious smoke, as well as ash and unburned raw material. These exhaust components are unpleasant to breathe and smell, and polluting to the atmosphere, and such operations are consequently often legally banned in populated areas as public nuisances. However, the term also includes furnaces designed and intended for the complete incineration of the raw material to ash, since the exhaust from such furnaces also often includes objectionable components due to faulty design or operation.

The exhaust from the furnace is amply hot as it emerges from the furnace that its combustible components will burn satisfactorily if combined with sufficient oxygen for a sufficient period of time, and a "clean" exhaust, that is, clear of smoke and relatively free of particulate matter, will result. All prior afterburners for this purpose within my knowledge have been subject to certain disadvantages.

For example, many prior afterburners have required an auxiliary fuel, such as pure oxygen or natural gas, as well as air, to burn the exhaust effectively, while the present device requires only air. Also, most prior afterburners have constituted combustion chambers disposed in and forming an element of the stack connection of the furnace, through which the furnace exhaust is drawn by the furnace draft, and into which air and other fuel gases are admitted to initiate combustion of its combustible components. Sometimes, the air and/or gases are admitted in such a manner as to create a whirling vortex in the chamber, in which vortex the exhaust is entrained to force it to travel a longer path in the chamber than would otherwise be the case to allow retention time for combustion to occur, and to produce turbulence for more thorough intermixture of the air and exhaust to promote more efficient combustion. This type of vortex afterburner has demonstrated certain defects of operation. For example, if the vortex induced by the jets is unidirectional, that is, if it moves in only one angular direction, the resulting flow pattern tends to become laminar or streamlined, actually producing a less than maximized degree of turbulence insufficient to insure thorough intermixture of the air and exhaust to produce efficient combustion. Moreover, any air vortex tends to develop a relatively calm "eye" along its core, within which "eye" there is only comparatively very slight air movement, and in which air and exhaust may be entrained and conveyed through the chamber relatively swiftly by the furnace draft. Thus, exhaust components present in the eye may pass through the chamber with less than efficient combustion thereof occuring.

Accordingly, one object of the present invention is the provision of an afterburner, also of the vortex type, in which sets of air-introducing jets are distributed at intervals along the length of the combustion chamber, with successive sets being operable to direct air in respectively opposite angular directions. This provides that as the exhaust passes through the chamber it is subjected to alternately reversing vortex actions. These reversals of direction create an extreme turbulence, insuring as complete and thorough intermixture of the air and exhaust as may be possible.

Another object is the provision of an afterburner of the character described having an axial core member filling the zone which otherwise would be occupied by the "eyes" of the air vortices. Thus the eyes are eliminated, together with the entrainment and conveyance of exhaust therein and resulting inefficient combustion thereof. Additionally, the core member may be utilized to deliver additional air to the chamber.

Still another object is the provision of an afterburner of the character described in which the oppositely directed sets of air jets may be relatively adjusted as to strength and volume of air delivered. This compensates for and takes advantage of the fact that some furnaces will tend to deliver exhaust to the afterburner with a natural tendency to rotate in one angular direction in the combustion chamber, while the exhuast from other furnaces will tend to turn naturally in the opposite angular direction, due to such factors as the flow patterns in particular furnaces, and the direction of rotation of a rotary furnace if the afterburner is serving a rotary furnace. Suppression of the jets favoring the natural direction of rotation, and enhancement of the oppositely directed jets, encourages the formation of more uniform, even vortices. In extreme cases, one or the other of the sets of jets may be shut off entirely.

A further object is the provision of an afterburner of the character described in which the sets of jets along the axial length of the combustion chamber may be independently adjusted as to strength and volume of the air delivered. This permits adjustment of the flow pattern in a direction longitudinal to the chamber, which permits more efficient handling of different types of exhaust, for example those containing a large amount of particulate solids as against those containing little or no solids, as will be described. Another advantage is that by controlling the air-gas mix the temperatures can be "tuned" to reduce and minimize the production of hydrogen oxide (NOX), as is usually desired.

A still further object is the provision of an afterburner of the character described which provides means for preheating the air to be injected into the combustion chamber. This prevents the cooling of the exhaust by the injected air to any extent which could interfere with efficient combustion of the combustible components of said exhaust.

Other objects are simplicity and economy of operation, and efficiency and dependability of operation.

Figure 2:
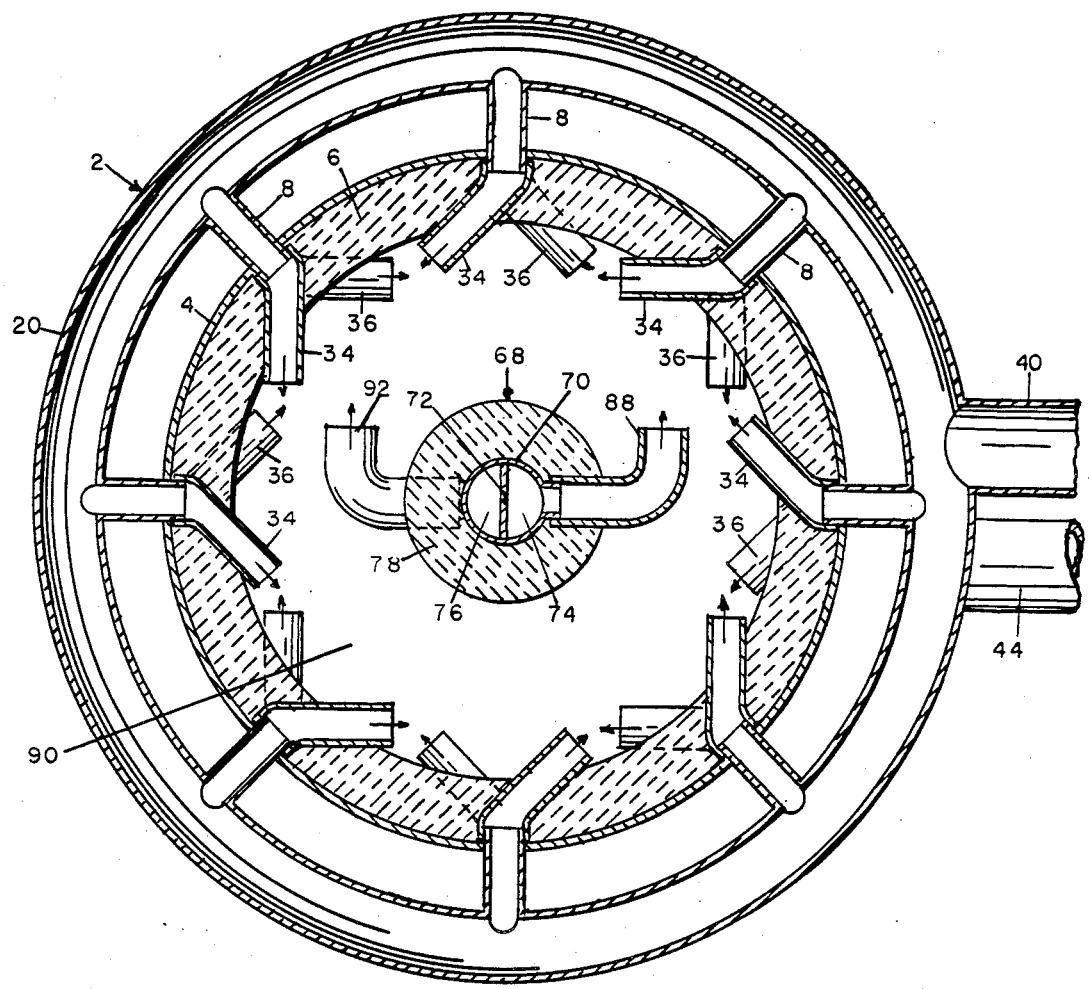

With these objects in view, as well as other objects which will appear in the course of the specification, reference will be had to the accompanying drawing, wherein:

FIG. 1 is a partially schematic, vertical sectional view of a furnace afterburner embodying the present invention, with parts broken away and left in elevation, and FIG. 2 is an enlarged sectional view taken generally on line II—II of FIG. 1.

Like reference numerals apply to similar parts throughout the drawing, and the numeral 2 generally indicates a furnace afterburner embodying the present invention. It includes a vertical cylindrical casing 4 formed of steel or other suitable material and having a lining 6 of a suitable refractory material. The casing terminates at its lower end in a hopper 8 for ash and other solid particulate material, said hopper having an outlet 10 controlled by a manually operable damper valve 12. The casing communicates at its upper end with a stack 14, which serves to create a draft drawing exhaust from a furnace, not shown, inwardly into the casing through a side inlet 16 adjacent the lower end thereof, as indicated by arrows 18, then upwardly through the casing and out through the stack, or to a boiler or other heat recovery system.

Surrounding the casing, in regularly spaced apart relation vertically of the casing, are a series of ring-shaped air delivery pipes 20, 22, 24, 26, 28, and 30. Six pipes are shown, but other numbers could be used if desired. A series of radial pipes 32 (eight shown) are spaced at equal angular intervals about each of the rings, being interconnected at their outer ends into associated ring, and extending inwardly through casing 4 into the interior of the casing. To the inner end of each pipe 32, within the casing, there is attached a nozzle to receive air from its associated pipe, and extending inwardly through refractory lining 6, being angled as best shown in FIG. 2 to direct jets of air generally tangentially into the interior of the casing. As will be seen in FIG. 2, the nozzles associated with rings 20, 24 and 28 are directed to induce a counter-clockwise flow of air, and are designated at 34, while the nozzles associated with rings 22, 26 and 30 are angled to induce a clockwise flow, and are indicated at 36. Rings 20, 24 and 28 are connected, each through a separate manually operated regulating damper 38, to a larger air duct 40, while rings 22, 26 and 30 are connected, each through a separate manually operated regulating damper 42, to a second air duct 44. Air ducts 40 and 44 are connected through a Y-fitting 46 to an air blower 48 which it will be understood is driven by an electric motor, not shown. Y-fitting 46 is controlled by a manually operable damper 50 which is operable to divide the air delivered by the blower between air ducts 40 and 44 in any desired proportion. The air inlet to the blower is partially controlled by a manually operated louvered damper 52 disposed in the intake mouth 54 of the blower, as indicated by arrows 56.

A tubular preheater coil 58 is disposed in the top portion of casing 4, above the level of the top ring 20. It draws air inwardly through an exterior inlet 60, as indicated by arrows 62, and delivers it through a conduit 64 to the intake of blower 48, between said blower and intake mouth 54. Thus the blower draws air through the preheater and delivers it to ducts 40 and 44 and hence to nozzles 34 and 36. The passage of the heated air from conduit 64 to the blower inlet is controlled by a manually operable damper valve 66, which is operable to vary the blower inlet proportionately between preheated air from inlet 60, and unheated air from inlet 54.

A generally cylindrical column, indicated generally by the numeral 68, is disposed coaxially in casing 4, being supported therein by any suitable means, not shown, and extending the full vertical height of the casing spanned by air inlet rings 20, 22, 24, 26, 28 and 30. Said column comprises a core pipe 70 divided internally by a partition wall 72, whereby to divide it into two longitudinally extending passages 74 and 76 extending the full length thereof, and covered by a thick layer 78 of refractory material which is externally cylindrical coaxially with the casing. Passage 74 of pipe 70 is interconnected through a conduit 80, in which is mounted a manually operable damper 82, to air duct 40, and pipe passage 76 is interconnected through a conduit 84, in which is mounted a manually adjustable damper 86, to air duct 44. At the level of each of air delivery rings 20, 24 and 28, an air nozzle 88 is interconnected into passage 74 of pipe 70, and is angled to direct air into the annular combustion chamber 90 defined between the refractory surfaces of casing 4 and column 68 in the same counter-clockwise direction as nozzles 34 of these rings, and at the level of each of rings 22, 26 and 30, an air nozzle 92 is interconnected into passage 76 of pipe 70, and is angled to direct air into combustion chamber 90 in the same clockwise direction as nozzles 36 of these rings.

In operation, furnace exhaust, which it will be understood may contain more or less large amounts of combustible but unburned gases, or more or less large amounts of ash and combustible but unburned particulate matter, moves into casing 4 through inlet 16, upwardly through combustion chamber 90 and over preheater 58, and outwardly through stack 14, being impelled by the draft of the furnace, which may be supplied either by stack 14, as shown, or by any suitable forced draft means. The exhaust entering casing 2 at 16 is still substantially at furnace temperature, and is sufficiently hot to allow burning of its combustible components if sufficient oxygen to support such combustion is added thereto to support said combustion, thoroughly intermixed therewith, and retained in the combustion chamber long enough for combustion to be completed. As the exhaust enters the casing, ash and other heavier than air particles fall therefrom by gravity and collect in hopper 8, from which they may be periodically disposed of through outlet 10 by opening damper valve 12.

With blower 48 in operation to deliver air jets through nozzles 34, 36, 88 and 92, it will be seen that as the exhaust rises through combustion chamber 90, it passes alternately through the counter-clockwise vortices induced in said chamber by nozzles 34 and 88, and the clockwise vortices induced by nozzles 36 and 92. This produces a high degree of turbulence, insuring extremely thorough intermixture of the exhaust and air, and also insures maximum time of retention of the mixture in the combustion chamber to allow full combustion of any components capable of being burned. The substantially helical and horizontal flow of the vortices provides a longer path for the mixture to follow, and hence increases the retention time. If the nozzles induced a uni-directional vortex throughout the length of the combustion chamber, the flow might to some extent become streamlined or laminar, with the result that while providing a good retention time, the intermixture would be less than maximized. On the other hand, if counter-directed nozzles were used, preferably about the same number in each direction, but were "patternless" in their arrangement so that they did not create vortices, the turbulence and the intermixture accomplished by said turbulence would be excellent, but the mixture could then be conveyed freely and rapidly through the chamber by the furnace draft, thus providing only an objectionably short and less than maximized retention time. The present arrangement of the nozzles, in which they are arranged in sets distributed along the length of the combustion chamber, with each successive pair thereof being arranged to induce vortices whirling in respectively opposite directions, provides an optimum condition in which extreme turbulence is produced in the zones wherein each vortex impinges on the counter-rotating adjacent vortices, in order to produce a highly efficient intermixture of the air and exhaust, and wherein the whirling vortex action occurring intermediate the turbulent zones provides the desired longer path and retention time to allow time for efficient combustion.

The presence of column 68 centrally in the combustion chamber is also extremely important to the efficiency of the device. The air vortices induced by nozzles 34, 36, 88 and 92, in common with all whirling bodies of air, tend to develop central zones or "eyes" in which the air flow is relatively calm and quiescent. In the present device, such eye zones would constitute a central air column of quiescent air in which the exhaust gases and particulate matter would be entrained, and through which they could rise under the influence of the furnace draft, or by the draft induced by any boiler or other heat recovery system which may be attached to the upper end of the afterburner, with little turbulence, and hence with less than efficient combustion, if the zone were not filled and obstructed by column 68. The column eliminates the quiescent zone, and produces a streamlined annular flow around the column, except of course in the zones in which extreme turbulence is created by the impingement of the counter-rotating vortices. The nozzles 88 and 92 carried by the column of course contribute to the whirling air motion generated by nozzles 34 and 36, but an additional and important function of the column is considered to be the filling of the quiescent eye zones of the vortices. Also, the air travel through the core pipe 70 of the column serves to aircool the column to protect it against deterioration by the intense heat generated in the combustion chamber.

The dampers 38, 42, 82 and 86, which control air flow respectively to nozzles 34, 36, 88 and 92, have the functions of regulating the total air flow, for example to bring the oxygen content thereof to correspond properly with the amount of combustible content of the exhaust, which is of course variable in different circumstances, and also to equalize the flow of air to all vertical stations of the combustion chamber, which is generally desirable, and also to permit delivery of variable quantities of air to different vertical stations of the combustion chamber when this may be desirable. For example, if in a particular furnace the exhaust effluvia may contain a larger than normal quantity of particulate material, it may be desirable to so regulate the air flow that less air is delivered to the lower levels of nozzles, and progressively greater amounts to the higher nozzles. This creates a slower vortex action, and lower air turbulence, in the lower portion of the combustion chamber, allowing time for the ash and other heavier than air particulate matter to settle into hopper 8 by gravity before being drawn into the vortices induced by the nozzles. In extreme cases, air flow to the lower nozzles could be shut off completely. On the other hand, exhausts containing high amount of combustible gas may require the maximum possible air supply to all of the nozzles at all levels. Damper 50 permits delivery of air selectively in larger quantity to those nozzles inducing clockwise air flow in the combustion chamber, or to those inducing counter-clockwise flow. This adapts the device better for use with furnaces which tend naturally to introduce exhaust into the afterburner with rotation in one direction or the other, the dominant flow of the afterburner being selected to counter the direction of rotation of the exhaust as it enters the afterburner.

Finally, the preheater 58 is of substantial importance to the efficiency of the device. Without it, the air introduced by blower 48 would be substantially cold, or at ambient atmospheric temperature, and could so cool the exhaust in the combustion chamber as to seriously reduce the efficiency of combustion of its combustible components. Of course, preheated air in the largest possible proportion should be used for the best efficiency, and damper 66 may be set to shut off the cold air supply from intake 54 entirely whenever a sufficient air supply from the preheater is available. Damper 52 may be opened to admit cold air, and damper 66 set to admit cold air to the blower, only when the available air supply from the preheater is deficient.

While I have shown and described a specific embodiment of my invention, it will be readily apparent that many minor changes of structure and operation could be made without departing from the spirit of the invention.

What I claim as new and desire to protect by Letters Patent is:

1. An afterburner for the exhaust effluvia of a furnace, which exhaust contains combustible material, said afterburner comprising:
   a. an elongated, generally cylindrical combustion chamber having an inlet for said exhaust at or adjacent one end thereof, and an outlet at or adjacent its other end,
   b. means operable to induce a draft through said combustion chamber from its inlet to its outlet,
   c. a series of air nozzles disposed to direct jets of air into the interior of said combustion chamber, certain of said nozzles being arranged to direct air jets into said combustion chamber substantially tangentially thereto in a clockwise direction, and the remainder of said nozzles being arranged to direct air jets into said chamber substantially tangentially thereto in a counter-clockwise direction, whereby to induce turbulence within said chamber to intermix said air and said exhaust thoroughly, and
   d. means operable to deliver air to said air nozzles.

2. An afterburner as recited in claim 1 wherein said air nozzles are arranged in sets distributed in spaced apart relation longitudinally along the length of said combustion chamber, with the nozzles of successive sets being arranged to deliver air jets substantially tangentially into the interior of said chamber in alternately clockwise and counter-clockwise directions, whereby the vortices created by the jets assist in retaining the exhaust in the chamber for longer time periods, and whereby the turbulence created in the zones in which the counter-rotating vortices impinge provides thorough intermixture of the air and the exhaust.

3. An afterburner as recited in claim 2 wherein said means for delivering air to said nozzles includes a separate air conduit for each of said sets of nozzles, and with the addition of a separate adjustable damper disposed in each of said conduits, whereby the force of the air jets delivered by said nozzles may be adjustably varied along the length of the combustion chamber.

4. An afterburner as recited in claim 2 wherein said means for delivering air to said nozzles includes a first air duct delivering air to the nozzles of the sets arranged to direct air into the combustion chamber in a counter-clockwise direction, and a second air duct delivering air to the nozzles of the sets arranged to direct air into said combustion chamber in a clockwise direction, an air blower operable to deliver air to both of said first and second ducts, and an adjustable damper operable to divide the output of said blower between said first and second ducts in any desired proportions.

5. An afterburner as recited in claim 4 wherein said means for delivering air to said nozzles includes a separate air conduit, each drawing air from the associated duct of said first and second ducts, and each delivering air to one of said sets of nozzles, and with the addition of a separate adjustable damper disposed in each of said conduits, whereby the force of the air jets delivered by said nozzles may be adjustably varied along the length of the combustion chamber.

6. An afterburner as recited in claim 1 with the addition of:

a. a preheater disposed in said combustion chamber adjacent the outlet end thereof, whereby air passing through said preheater is heated by the heat of said combustion chamber, said means for delivering air to said nozzles including an air blower, the inlet of said air blower being connected both to the outlet of said preheater and to atmosphere, and b. an adjustable damper operable to divide the intake of said blower between said preheater and atmospheric air in any desired proportions.

7. An afterburner as recited in claim 2 with the addition of an externally generally cylindrical column disposed coaxially in said combustion chamber and extending the full length thereof occupied by said sets of nozzles, whereby to fill and obstruct the relatively calm central zones of the vortices generated by said nozzles.

8. An afterburner as recited in claim 7 wherein said column is provided with an internal air passage interconnected with the air supply means of said nozzles, and with nozzles interconnected with said internal air passage and operable to direct air jets into said combustion chamber to assist the vortex-creating action of the nozzles not carried by said column.

9. An afterburner as recited in claim 8 wherein column is provided with two longitudinally extending internal air passages interconnected respectively to the air supply means of the nozzles arranged to direct air in the chamber in a counter-clockwise direction, and to the air supply means of the nozzles arranged to direct air in the chamber in a clockwise direction, and each having a nozzle directed into the combustion chamber at the longitudinal positions of the chamber nozzle sets operable to direct air in the corresponding tangential direction, each of the column nozzles being angled to direct an air jet into the combustion chamber in the same tangential direction as the corresponding chamber nozzles.

* * * * *